(12) United States Patent
Wei et al.

(10) Patent No.: US 9,575,264 B2
(45) Date of Patent: Feb. 21, 2017

(54) OPTICAL FIBER CONNECTOR

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Le-Peng Wei, Shenzhen (CN); Zhi-Ming Li, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 18 days.

(21) Appl. No.: 14/601,473

(22) Filed: Jan. 21, 2015

(65) Prior Publication Data

US 2015/0234130 A1   Aug. 20, 2015

(30) Foreign Application Priority Data

Feb. 14, 2014   (CN) .......................... 2014 1 0051212

(51) Int. Cl.
*G02B 6/38*   (2006.01)

(52) U.S. Cl.
CPC .................................. *G02B 6/3887* (2013.01)

(58) Field of Classification Search
None
See application file for complete search history.

(56) References Cited

U.S. PATENT DOCUMENTS

| 9,250,398 B2* | 2/2016 | Wu ....................... G02B 6/3874 |
| 2011/0044588 A1* | 2/2011 | Larson ................ G02B 6/3887 385/81 |
| 2012/0328248 A1* | 12/2012 | Larson ................ G02B 6/3887 385/81 |
| 2014/0037250 A1* | 2/2014 | Treadwell ............ G02B 6/3887 385/78 |

FOREIGN PATENT DOCUMENTS

CN        102854578 A  *  1/2013

\* cited by examiner

*Primary Examiner* — Mike Stahl
(74) *Attorney, Agent, or Firm* — Zhigang Ma

(57) ABSTRACT

An optical fiber connector includes a collar body with a defined interior space extending from a first end to a second end, a backbone with a main body portion and a cover portion extending from the main body portion, the backbone having a defined interior space extending from a first end to a second end, and a boot with a defined interior space extending from a first end to a second end, a portion of the defined interior space including a convex interior wall. The collar body is inserted into at least a portion of the backbone defined space and the backbone is inserted into at least a portion of the boot defined space. The boot interior wall is configured to resist against the backbone cover portion to clamp an optical fiber in the backbone main body portion.

8 Claims, 7 Drawing Sheets

OPTICAL FIBER CONNECTOR

FIELD

The subject matter herein generally relates to an optical connector.

BACKGROUND

Mechanical optical fiber connectors for the telecommunications industry are known. For example, LC, ST, FC, and SC optical connectors are widely used.

BRIEF DESCRIPTION OF THE DRAWINGS

Implementations of the present technology will now be described, by way of example only, with reference to the attached figures.

DETAILED DESCRIPTION

Figure 1:
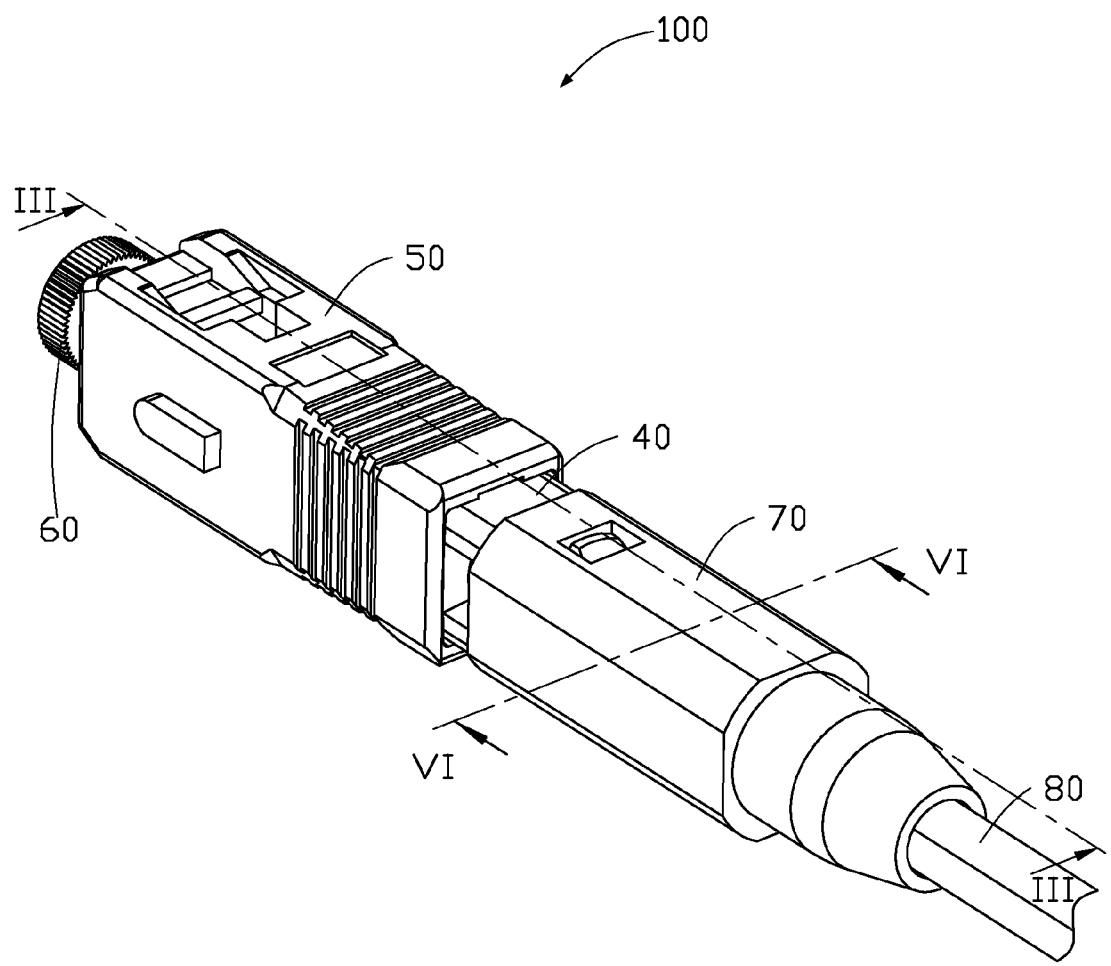
FIG. 1 illustrates an assembled, isometric view of an optical fiber connector including a backbone and a boot.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

An optical fiber connector can include a collar body with a defined interior space extending from a first end to a second end, a backbone with a main body portion and a cover portion extending from the main body portion, the backbone having a defined interior space extending from a first end to a second end, and a boot with a defined interior space extending from a first end to a second end, a portion of the defined interior space including a convex interior wall. The collar body can be inserted into at least a portion of the backbone defined space and the backbone is inserted into at least a portion of the boot defined space. The boot interior wall can be configured to resist against the backbone cover portion to clamp an optical fiber in the backbone main body portion.

Figure 2:
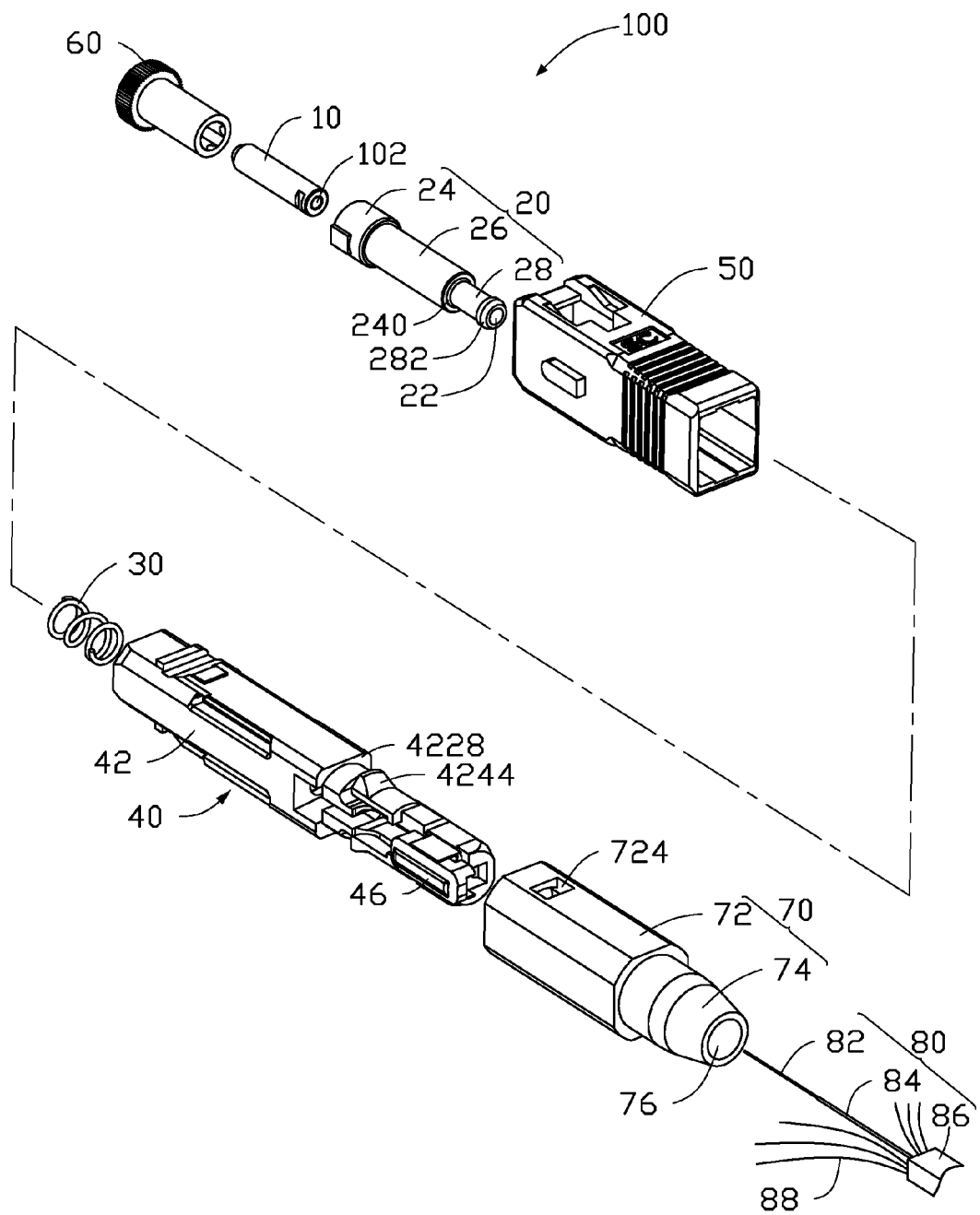
FIG. 2 is an exploded view of the optical fiber connector of FIG. 1.
Figure 3:
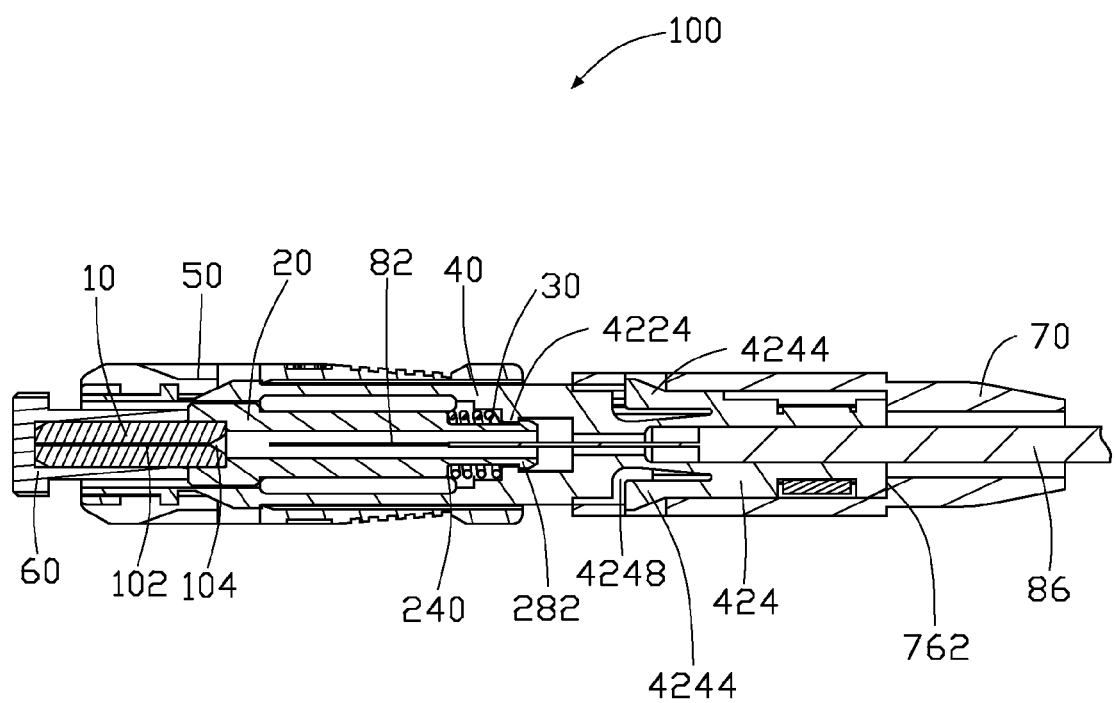
FIG. 3 is a cross-sectional view of the optical fiber connector of FIG. 1 along a line III-III.

FIG. 1 illustrates an optical fiber connector 100. The optical fiber connector 100 can be in a SC type in this illustrated embodiment. Also referring to FIG. 2, the optical fiber connector 100 can include an optical fiber ferrule 10, a collar body 20, an elastic member 30, a backbone 40, a housing 50, a dustproof 60, and a boot 70. Referring to FIG. 3, the optical fiber ferrule 10 can be inserted in one end of the collar body 20. The elastic member 30 can be sleeved on the collar body 20 away from the optical fiber ferrule 10. The collar body 20 can be received in the backbone 40 together with the elastic member 30. The housing 50 can be sleeved on a first end of the backbone 40. The dustproof 60 can be sleeved on one end of the optical fiber ferrule 10 away from the collar body 20 and received in the housing 50. The boot 70 can be mechanically coupled together with the backbone 40 at another end of the backbone 40.

The optical fiber connector 100 can be used for restricting lateral motion of a fiber cable 80. Referring to FIG. 2 again, the fiber cable 80 can include an optical fiber 82, an inner jacket 84 forming on the optical fiber 82, an outer jacket 86 forming on the inner jacket 84. Part of one end of the inner jacket 84 and the outer jacket 86 can be removed to allow the fiber cable 80 to be received in the optical fiber ferrule 10. The fiber cable 80 can further include a plurality of strength members 88 between the inner jacket 84 and the outer jacket 86.

Referring to FIG. 3, the optical fiber ferrule 10 can be substantially cylindrical-shaped, and be made of ceramic materials. The optical fiber ferrule 10 axially defines a through hole 102 to receive the optical fiber 82. The optical ferrule 10 further defines a guiding hole 104 being air communicating with the through hole 102 in an end of the optical ferrule 10 to facilitate the insertion of the optical fiber 82 into the through hole 102. In the illustrated embodiment, a diameter of the through hole 102 is slightly greater than a diameter of the optical fiber 82, to facilitate passing the optical fiber 82 through. When an end of the optical fiber 82 encounters a resistance, the optical fiber 82 can be elastically bent in the through hole 102, which holds the optical fiber 82 in place. The guiding hole 104 can be substantially funnel shaped with a smaller end of the guiding hole 104 communicating with the through hole 102, which prevents the optical fiber 82 from breaking when being bent at a distal end of the through hole 102.

Referring to FIG. 2 again, the collar body 20 can have a defined interior space 22 extending from a first end to a second end. The collar body 20 can include a base body 24, an insertion portion 26, and an installation portion 28. The insertion portion 26 and the installation portion 28 can be formed on two ends of the base body 24. In the illustrated embodiment, a diameter of the insertion portion 26 can be greater than that of the base body 24. The diameter of the base body 24 can be greater than a diameter of the installation portion 28 so as to form a shoulder surface 240. The optical fiber ferrule 10 can be fixedly inserted in the insertion portion 26 away from the base body 24. A flange 282 can be formed around an edge of the installation portion 28 away from the insertion portion 26. In the illustrated embodiment, the optical fiber ferrule 10 can splice the collar body 20 with a method of insert molding, and then an anti-tensile strength of the optical fiber ferrule 10 can be achieved to more than 200 N. The elastic member 30 can be sleeved on the installation portion 28. The elastic member 30 can be a cylindrical helical spring. In other embodiments, the elastic member 30 can be an elastic sleeve or elastic shrapnel.

Figure 4:
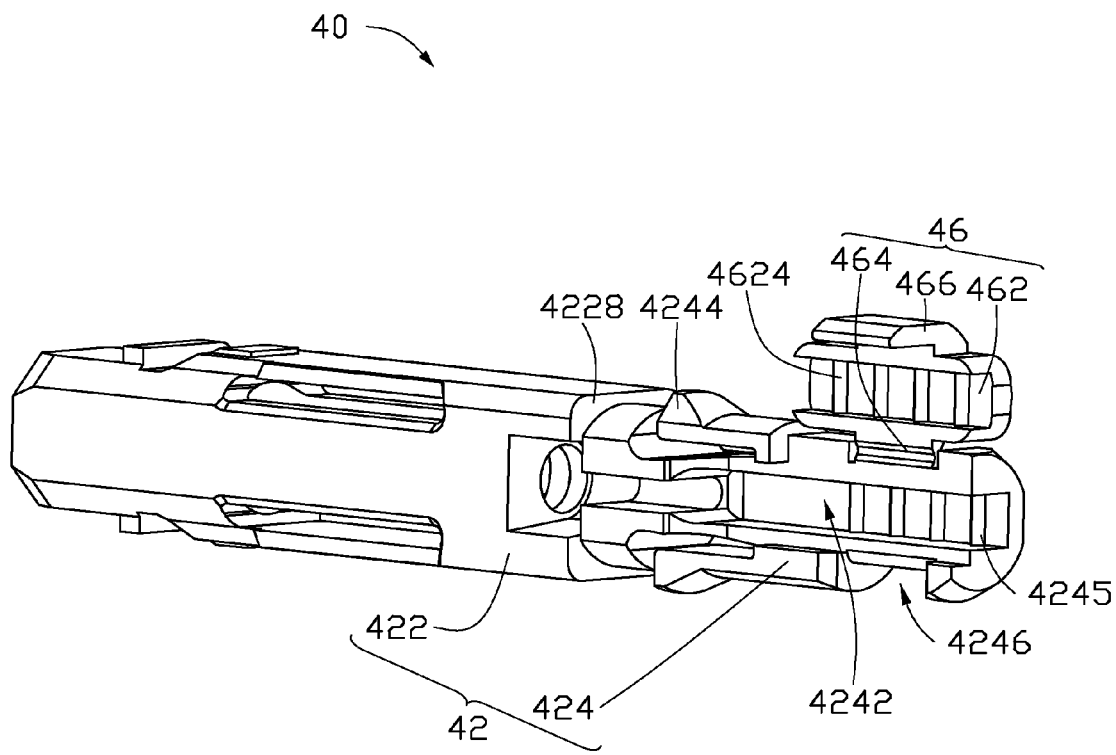
FIG. 4 shows a view of an open state for a cover of the backbone.
Figure 5:
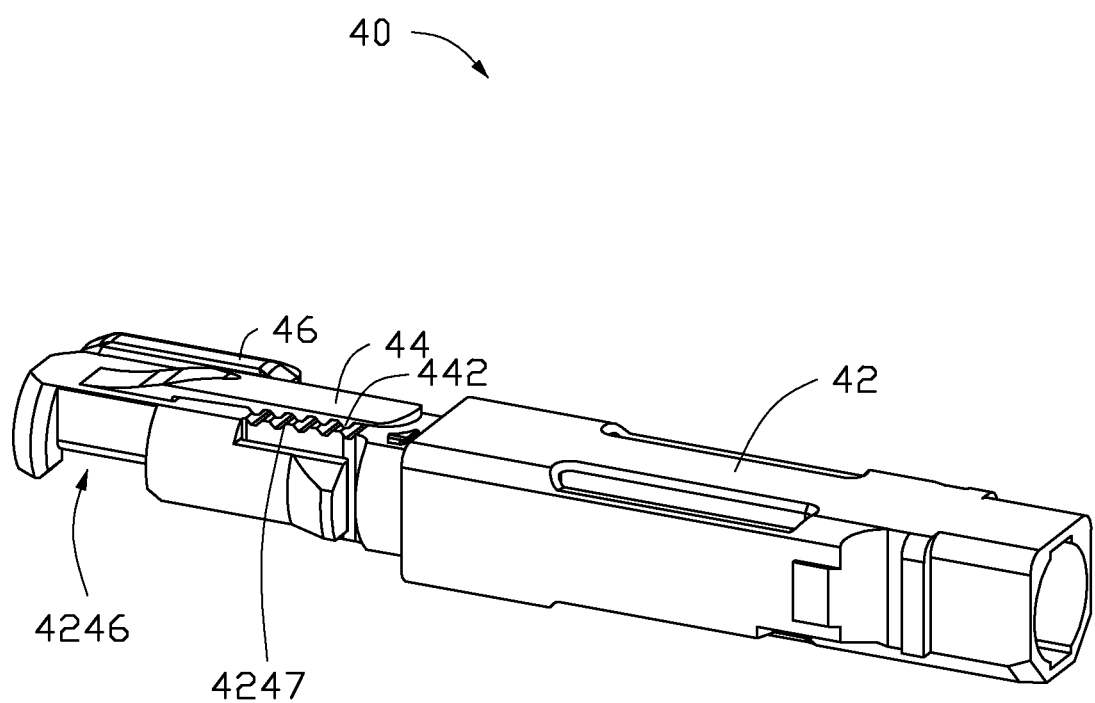
FIG. 5 is similar to FIG. 4, but from another aspect.

FIGS. 4 and 5 illustrates that the backbone 40 can include a main body 42, a crimp arm 44, and a cover 46. An interior space can be defined in the main body 42 extending from a first end to a second end. The main body 42 can include a mounting portion 422 and a receiving portion 424 extending from one end of the mounting portion 422. The collar body 20 and the elastic member 30 can be received in the mounting portion 422. A resisting portion 4224 (as shown in FIG. 3) can be formed on an inner wall of the mounting portion 422 corresponding to the flange 282. The elastic member 30 can resist between the resisting portion 4224 and the shoulder surface 240. The resisting portion 4224 can resist against the flange 282 under a resistance of the elastic member 30, so as to prevent the collar body 20 escaping from the backbone 40. A receiving groove 4242 can be formed on the receiving portion 424 along an axis of the main body 42 and be air communicating with a hollow portion of the resisting portion 4224 for receiving the fiber cable 80. A pair of first locking portions 4244 can protrude from an outer sidewall of the receiving portion 424 to engage with the boot 70. Each first locking portion 4244 can be a jib structure. One end of the first locking portion 4244 can be fixed on the outer sidewall of the receiving portion 424, and another end of the first locking portion 4244 can be a free end and extend towards the mounting portion 422 to engage with the boot 70. A plurality of ribbon-shaped protrusions 4245 can be formed on a bottom surface of the receiving groove 4242 to stably clamp the fiber cable 80. A resisting shoulder 4228 can be formed at a joint of the mounting portion 422 and the receiving portion 424 for guiding the boot 70 in assembly. A retaining groove 4246 can be formed in a sidewall of the receiving portion 424. A zigzag-shaped first engaging portion 4247 (as shown in FIG. 5) can be formed on an outer wall of the main body 42 and be opposite to the receiving groove 4242. A pair of recess grooves 4248 (as FIG. 3 shown) can be formed on opposite sidewalls of the receiving portion 424 for receiving part of one respective first locking portion 4244.

Referring to FIG. 5, the crimp arm 44 can be a jib structure. One end of the crimp arm 44 can be fixed on the receiving portion 424, and another end of the crimp arm 44 can be a free end and extend towards mounting portion 422. The crimp arm 44 can be positioned above the first engaging portion 4247. A zigzag-shaped second engaging portion 442 can be formed on the crimp arm 44 corresponding to the first engaging portion 4247. The second engaging portion 442 can mesh with the first engaging portion 4247 so as to stably clamp the strength member 88 between the first engaging portion 4247 and the second engaging portion 442.

Referring to FIG. 4 again, the cover 46 can be rotatably coupled to the receiving portion 424. The cover 46 can rotate from a close position (as shown in FIG. 2) to an open position (as shown in FIG. 4). The cover 46 can cover the receiving groove 4242 when in the close position. In the illustrated embodiment, the cover 46 can include a cover portion 462 and a first connecting portion 464, and a second connecting portion 466. The first connecting portion 464 and the second connecting portion 466 extend from opposite edges of the cover portion 462 towards a same direction. The first connecting portion 464 can be rotatably coupled to the receiving portion 424 away from the cover portion 462. The second connecting portion 466 can be received in the retaining groove 4246 when the cover 46 in the close position. A plurality of ribbon-shaped protrusions 4624 can be formed on a surface of the cover portion 462 corresponding to the protrusions 4245 of the receiving portion 424. The protrusions 4624 of the cover 46 and the protrusions 4245 of the receiving portion 424 will clamp the fiber cable 80 tightly when the cover 46 and the receiving portion 424 are under a resistance. In the illustrated embodiment, the cover 46 and the main body 42 can be integrally formed, and the first connecting portion 464 can directly movably couple to the main body 42. In other embodiments, the first connecting portion 464 can rotatably couple to the main body 42 with a rotation shaft (not shown). The second connecting portion 466 can be designed to clamp with sidewall of the retaining groove 4246. The cover 46 can just cover the receiving groove 4242.

The housing 50 can be shaped to facilitate an installation of the optical fiber connector 100 into an adapter (not shown) in the embodiment. In the illustrated embodiment, the housing 50 can be substantially in a rectangular shape. The housing 50 can sleeve on the backbone 40 adjacent to the collar body 20.

Figure 6:
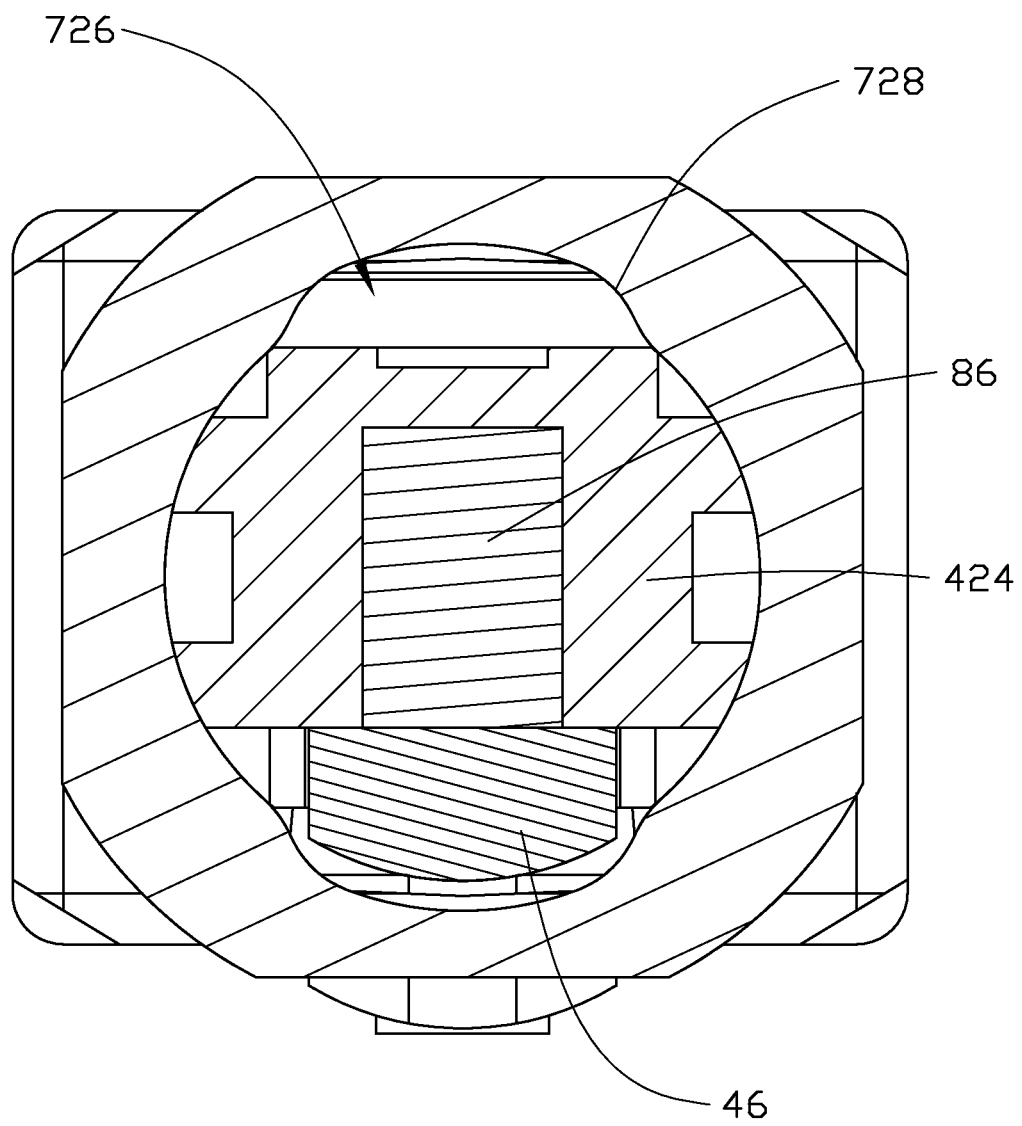
FIG. 6 is a cross-sectional view of a release state of the optical connector of FIG. 1 when the boot releases the backbone along a line of VI-VI.
Figure 7:
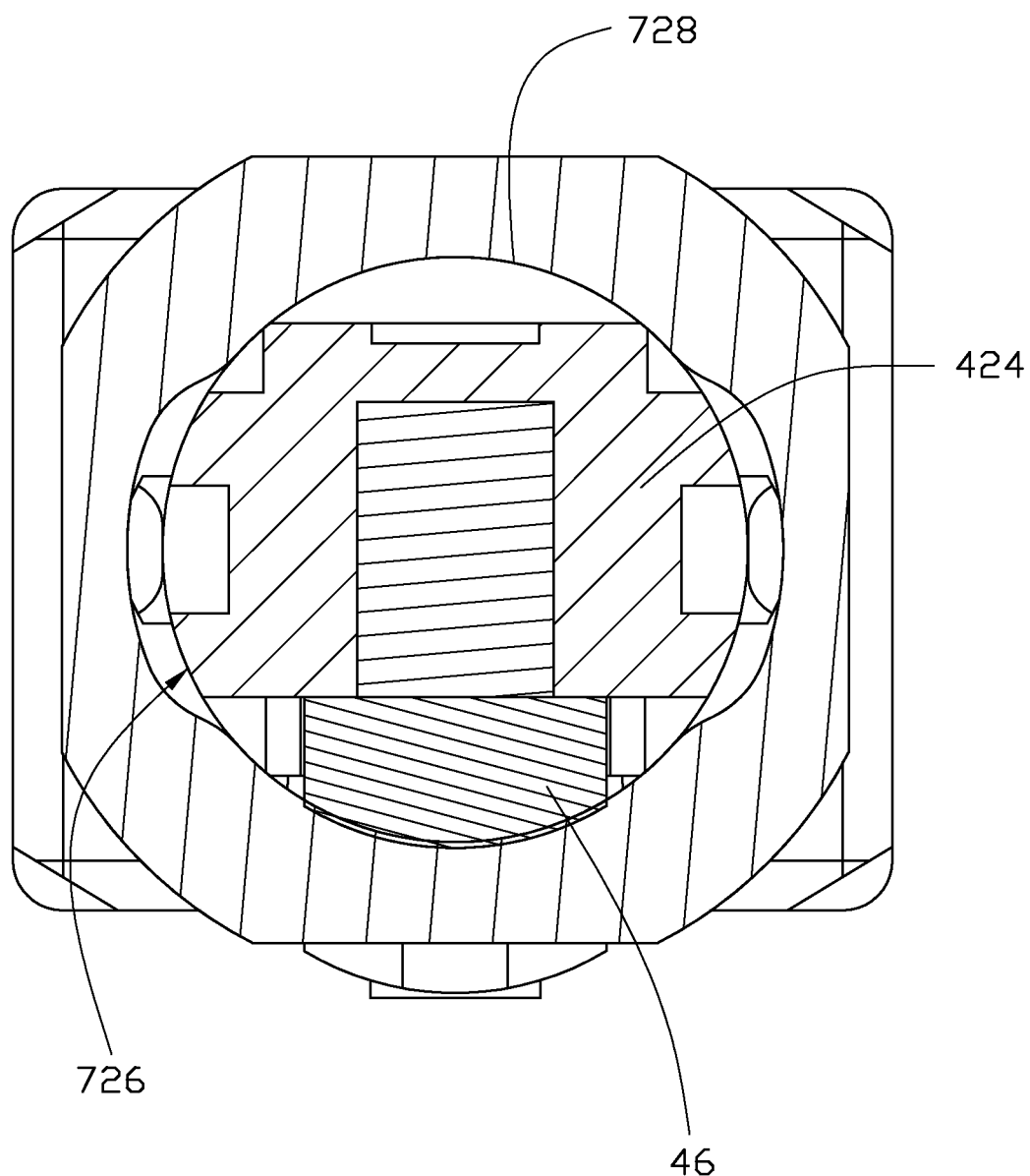
FIG. 7 is a cross-sectional view of a clamp state of the optical connector of FIG. 1 when the boot clamps the backbone along a line of VI-VI.

Referring to FIGS. 2 and 3, the boot 70 can sleeve on the backbone 40 and positioned oppositely to the housing 50. The boot 70 can include a first boot body 72 and a second boot body 74 extending from the first boot body 72. A stepped hole 76 can be defined in the boot 70 through the first boot body 72 and a second boot body 74, and a positioning surface 762 can be formed. A pair of second locking portion 724 can be oppositely formed on the first boot body 72 corresponding to the first locking portion 4244. The free end of each first locking portion 4244 can be locked in one respective second locking portion 724. In the illustrated embodiment, the second locking portions 724 are through holes. As FIGS. 6 and 7 shown, two recesses 726 can be oppositely formed on an inner of the first boot body 72 and extend towards the second boot body 74, so as to form a convex surface 728. The convex surface 728 can resist against the cover 46 and the receiving portion 424, then the fiber cable 80 can be stably hold in the receiving groove 4242. The first boot body 72 can resist against the crimp arm 44, that else the strength members 88 can be stably crimped between the crimp arm 44 and the main body 42.

In assembly, the optical fiber ferrule 10 can be fixedly inserted in the insertion portion 26. The elastic member 30 can sleeve on the installation portion 28. The collar body 20 can be received in the backbone 40 together with the elastic member 30 and the optical fiber ferrule 10. The elastic member 30 can resist between the resisting portion 4224 and the shoulder surface 240. The resisting portion 4224 can latch with the flange 282 under a force of the elastic member 30 to stop a lateral motion of the collar body 20. The housing 50 can be sleeved on the backbone 40. The boot 70 can be sleeved on the backbone 40. In an unlocking state for the optical fiber connector 100, a sidewall having the second locking portion 724 can be positioned substantially parallel to a sidewall having the crimp arm 44 of the backbone 40.

Each first locking portion 4244 can be locked in one respective second locking portion 724 when rotating the boot 70 around the backbone 90 degrees to enable the optical fiber connector 100 in a locking state. The boot 70 cannot move relative to the backbone 40. The convex surface 728 can resist against the cover portion 462 and the crimp arm 44.

In use, the fiber connector 100 can be unlocked via pressing the first locking portion 4244. The boot 70 can be taken off after a rotation. The fiber cable 80 can be inserted into the stepped hole 76, the receiving groove 4242 and the collar body 20. Part of the fiber cable 80 without the outer jacket 86 can be received in mounting portion 422. Part of the fiber cable 80 with the outer jacket 86 can be received in the receiving groove 4242. The strength members 88 can be positioned between the first engaging portion 4247 and the second engaging portion 442. The boot 70 can be pushed and sleeved on the backbone 70. The boot 70 can be locked with the backbone 40 after a 90 degrees rotation. The convex surface 728 can resist against the crimp arm 44, the strength members 88 can be statably clamped between the crimp arm 44 and the main body 42. The convex surface 728 also can resist the cover 46 and the receiving portion 424, that else the fiber cable 80 with the outer jacket 86 can be stably hold in the receiving portion 424.

In other embodiments, the elastic member 30, the housing 50, the dustproof 60 can be omitted.

In other embodiments, the crimp arm 44 can be omitted when the fiber cable 44 without any strength member 88. The crimp arm 44 can be not a jib, two ends of the crimp arm 44 can be fixed on the receiving portion 424, but a gap can be positioned between the crimp arm 44 and the receiving portion 424 for receiving the strength members 88.

In other embodiments, the number of the recess 726 is not limited to two, it can be one, the convex surface 728 just can resist against the cover 46 and the receiving portion 424. The recess 726 also can be omitted.

In other embodiments, the first engaging portion 4247 and the second engaging portion 442 can be omitted, the strength member 88 can be directly crimped between the crimp arm and the receiving portion 424.

In other embodiments, the first locking portion 4244 and the second locking portion 724 can be omitted, the boot 70 and the backbone 40 can be fixed together with other methods, for example, the boot 70 can fixedly sleeve on the backbone 40 via a friction therebetween.

In other embodiments, the shoulder surface 240 can be omitted, a diameter of the collar body 20 can be designed to decrease from a first end adjacent to the boot 70 to a second end adjacent to the optical fiber ferrule 10.

The embodiments shown and described above are only examples. Many details are often found in the art such as the other features of an optical fiber connector. Therefore, many such details are neither shown nor described. Even though numerous characteristics and advantages of the present technology have been set forth in the foregoing description, together with details of the structure and function of the present disclosure, the disclosure is illustrative only, and changes may be made in the details, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An optical fiber connector, comprising:
   a collar body, the collar body comprising a defined interior space extending from a first end to a second end;
   a backbone, the backbone comprising a main body, and a crimp arm protruding from an outer wall of the main body, the backbone having a defined interior space extending from a first end to a second end; and
   a boot, the boot comprising a defined interior space extending from a first end to a second end, a portion of the defined interior space including a convex interior wall;
   wherein, the collar body is inserted into at least a portion of the backbone defined space, and the backbone is inserted into at least a portion of the boot defined space;
   wherein the crimp arm clamps a plurality of strength members of a fiber cable with the main body under a resistance of an inner wall of the boot; and
   wherein a zigzag-shaped first engaging portion is formed on the outer wall of the main body towards the crimp arm, a zigzag-shaped second engaging portion is formed on the crimp arm, and the second engaging portion is meshed with the first engaging portion.

2. The optical fiber connector of claim 1, wherein the crimp arm is a jib structure, and wherein one end of the crimp arm is fixed on the main body, and another end of the crimp arm is free to move.

3. The optical fiber connector of claim 1, wherein the optical fiber connector further comprises an elastic member covering the collar body, a flange formed around an edge of the collar body at one end, a resisting portion formed on an inner wall of the main body corresponding to the flange, wherein the resisting portion resists against the flange under a resistance of the elastic member so as to prevent the collar body from escaping from the backbone.

4. The optical fiber connector of claim 1, wherein the boot comprises a first boot body and a second boot body, the second boot body extending from the first boot body, wherein a stepped hole is defined in the boot through the first boot body and the second boot body so as to form a positioning surface, wherein the positioning surface resists against an end of the main body located away from the collar body.

5. The optical fiber connector of claim 1, wherein the backbone further comprises a cover coupled to the main body.

6. The optical fiber connector of claim 1, wherein the main body comprises a mounting portion and a receiving portion extending from the mounting portion at one end, wherein the collar body is received in the mounting portion, and wherein the cover comprises a cover portion and a first connecting portion extending from the cover portion, the first connecting portion is rotatably coupled to the receiving portion, the cover portion is positioned on the receiving portion, and the boot covers over the receiving portion.

7. The optical fiber connector of claim 6, wherein the cover further comprises a second connecting portion, the first connecting portion and the second connecting portion extend from opposite edges of the cover portion towards a same direction, a retaining groove is formed in the receiving portion corresponding to the second connecting portion, and the second connecting portion is received in the retaining groove.

8. An optical fiber connector, comprising:
   a collar body, the collar body comprising a defined interior space extending from a first end to a second end;

a backbone, the backbone comprising a main body, a crimp arm protruding from an outer wall of the main body, and a cover coupled to the main body, the backbone having a defined interior space extending from a first end to a second end; and a boot, the boot comprising a defined interior space extending from a first end to a second end, a portion of the defined interior space including a convex interior wall;

wherein, the collar body is inserted into at least a portion of the backbone defined space and the backbone is inserted into at least a portion of the boot defined space; and wherein the crimp arm clamps a plurality of strength members of a fiber cable with the main body under a resistance of an inner wall of the boot.

\* \* \* \* \*